US008639715B1

(12) United States Patent
Brinck et al.

(10) Patent No.: US 8,639,715 B1
(45) Date of Patent: Jan. 28, 2014

(54) AUCTIONABLE RICH MEDIA SEARCH SUGGESTIONS

(75) Inventors: Thomas G. Brinck, Palo Alto, CA (US); Matthew W. Amacker, San Jose, CA (US); Ryan M. White, San Francisco, CA (US); Bryce Erwin, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 345 days.

(21) Appl. No.: 12/830,206

(22) Filed: Jul. 2, 2010

Related U.S. Application Data

(60) Provisional application No. 61/345,021, filed on May 14, 2010.

(51) Int. Cl.
*G06F 17/30* (2006.01)

(52) U.S. Cl.
USPC .......................................... 707/767; 709/231

(58) Field of Classification Search
USPC ..................... 707/709, 767, 6, 758, 102, 719; 719/311
See application file for complete search history.

(56) References Cited

U.S. PATENT DOCUMENTS

| 7,152,042 | B1 * | 12/2006 | Arkes ............................... 705/37 |
| 7,593,928 | B2 * | 9/2009 | Canon et al. ........................... 1/1 |
| 7,725,465 | B2 * | 5/2010 | Liao et al. ..................... 707/728 |
| 7,752,326 | B2 * | 7/2010 | Smit ............................. 709/231 |
| 7,792,858 | B2 * | 9/2010 | Tang et al. ..................... 707/780 |
| 7,831,586 | B2 * | 11/2010 | Reitter et al. ................. 707/709 |
| 8,055,673 | B2 * | 11/2011 | Churchill et al. ............. 707/767 |
| 8,073,860 | B2 * | 12/2011 | Venkataraman et al. ...... 707/759 |
| 8,204,897 | B1 * | 6/2012 | Djabarov et al. ............. 707/767 |
| 8,234,276 | B2 * | 7/2012 | Skinner ......................... 707/735 |
| 8,312,036 | B2 * | 11/2012 | Chang et al. .................. 707/767 |
| 8,370,329 | B2 * | 2/2013 | Gutt et al. ..................... 707/721 |
| 2008/0114743 | A1 * | 5/2008 | Venkataraman et al. ......... 707/3 |
| 2008/0147653 | A1 * | 6/2008 | Collier .............................. 707/6 |
| 2008/0147709 | A1 * | 6/2008 | Read .............................. 707/102 |
| 2008/0304808 | A1 * | 12/2008 | Newell et al. .................... 386/52 |
| 2009/0240683 | A1 * | 9/2009 | Lazier et al. ....................... 707/5 |
| 2010/0185644 | A1 * | 7/2010 | Gutt et al. ..................... 707/759 |
| 2011/0072033 | A1 * | 3/2011 | White et al. .................. 707/768 |
| 2011/0119242 | A1 * | 5/2011 | Chen et al. ................... 707/740 |
| 2011/0161311 | A1 * | 6/2011 | Mishne et al. ................ 707/719 |
| 2011/0173217 | A1 * | 7/2011 | Kasperski ..................... 707/767 |

* cited by examiner

*Primary Examiner* — James Trujillo
*Assistant Examiner* — Thong Vu
(74) *Attorney, Agent, or Firm* — Novak Druce Connolly Bove + Quigg LLP

(57) ABSTRACT

Rich media search suggestions may be provided to search facility users. Rich media search suggestions may occupy various sizes of search suggestion presentation "real estate," and may change size, for example, in response to user interaction. A search facility may partially or fully delegate responsibility for providing search suggestions to third party search suggestion providers. Available search suggestion places may be auctioned to interested third party search suggestion providers. Third party search suggestion providers may be responsible for providing search suggestion presentation specifications (e.g., specified with hypertext markup language) for the delegated search suggestion places. Such search suggestion presentation specifications may be provided at bid time and/or in real-time in response to search input by users. Search input by users may be "streamed" in real-time to third party search suggestion providers, and corresponding search suggestions updated in real-time by the third party search suggestion providers in response.

25 Claims, 8 Drawing Sheets

AUCTIONABLE RICH MEDIA SEARCH SUGGESTIONS

CROSS-REFERENCE TO RELATED APPLICATION

The present application claims the benefit of U.S. Provisional Application No. 61/345,021, filed May 14, 2010, the full disclosure of which is incorporated herein by reference.

BACKGROUND

It has become commonplace to use computers to search large collections of content. For example, a user may enter search terms at a search client, submit the search terms to a search service and, in return, receive a set of search results with varying degrees of relevance to the search terms. It is common for users to enter search terms as freeform strings of characters. This can be problematic for various reasons including the use of different terms to describe the same content, unfamiliarity with descriptive terms for content of interest, unfamiliarity with search terms used to index a particular content collection of interest, unfamiliarity with subject matter concentrations in a particular content collection, as well as misspelling, mistyping and the like.

Some search facilities have begun providing search suggestions. For example, as a freeform string of characters is entered at the search client, the search client may display a list of popular search terms that begin with the characters entered so far. However, conventional search suggestions can also be problematic. For example, the user may not understand the connection between the intended search and the search suggestions being provided. Some of the terms in the search suggestions may be unfamiliar. The search suggestions may change rapidly as the user enters additional characters or, for example, deletes mistyped characters, causing confusion. Some search suggestions may be inappropriate for viewing by the user, for example, inappropriate with respect to the user's age and/or sensibilities.

In addition, although modern content collections may have many different contributors and/or be sourced from many different providers, conventional search suggestions are typically made by the search facility. Peculiarities of the search suggestion determination process may emphasize some content, contributors and/or providers to the detriment of others. Furthermore, conventional search suggestion determination processes may be inflexible and/or inefficient with respect to changing user tastes and/or interests.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
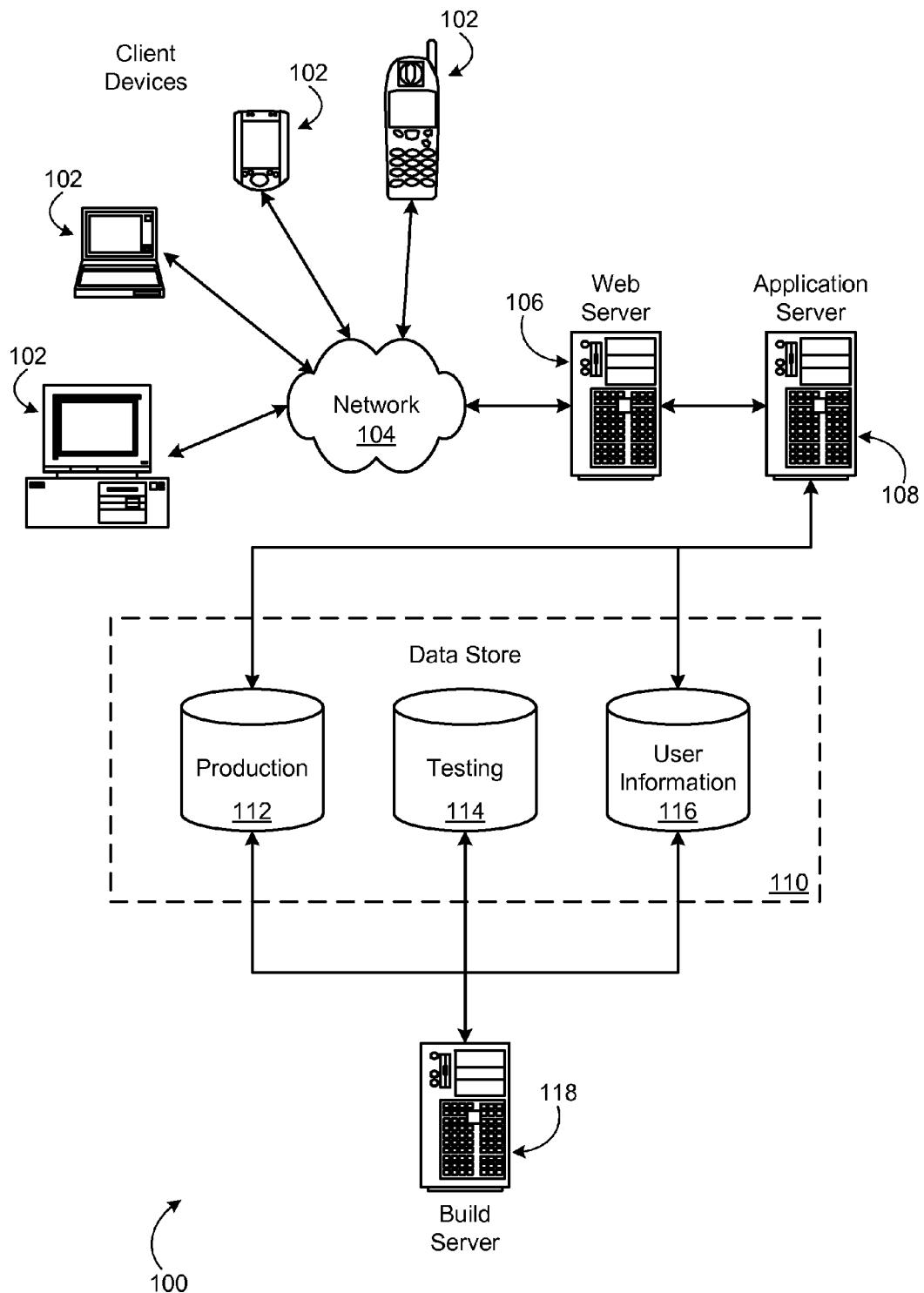
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments provide for the inclusion of enhanced or additional content with, or in place of, traditional suggestions for search queries and/or other such requests or inputs. In at least one embodiment, rich media search suggestions may be provided to search facility users. Rich media search suggestions may utilize rich media to present, suggest and/or emphasize search options, including search terms, to search facility users. For example, rich media search suggestions may include animated and/or interactive graphics, video, audio, advertisements and full-functionality applications such as games. Search suggestions provided in response to user input may include text search suggestions as well as rich media search suggestions in various configurations and arrangements. For example, one or more search suggestion places may be made available for rich media search suggestions in a search suggestion presentation (e.g., window) along with text search suggestions. A search suggestion presentation containing multiple rich media search suggestions may be made available as an alternate to, or in addition to, a text search suggestion presentation. Rich media search suggestions may occupy various sizes of search suggestion presentation "real estate," and may change size, for example, in response to user interaction.

A search facility may partially or fully delegate responsibility for providing search suggestions to third party search suggestion providers. In at least one embodiment, available search suggestion places may be auctioned to interested third party search suggestion providers. For example, third party search suggestion providers may bid to provide search suggestions associated with a sequence of characters such as a keyword prefix, and one or more search suggestion places may be made available for winning bidders. Third party search suggestion providers may be responsible for providing search suggestion presentation data such as presentation specifications (e.g., specified with hypertext markup language) for the delegated search suggestion places. Such search suggestion presentation data may be provided at bid time and/or in real-time in response to search input by users.

Search input by users may be "streamed" in real-time to third party search suggestion providers, and corresponding search suggestions updated in real-time by the third party search suggestion providers in response.

A hysteresis condition may be specified for rich media search suggestions and/or auctioned search suggestions. For example, the hysteresis condition may specify that once presented to a user, a rich media search suggestion may be presented for a hysteresis period of time independent of additional search input and/or search input changes by the user. Alternatively, or in addition, the hysteresis condition may specify a number of input stream elements, such as characters of a keystream, a set of user actions, such as input field defocus, and/or a number of keywords entered by a user to be detected before the rich media search suggestion may be unpresented (e.g., before its search suggestion place is made available to another rich media search suggestion). As a further example, each rich media search suggestion may have a "lock-in" option that causes the rich media search suggestion to be presented persistently, at will and/or until deactivated, and the hysteresis condition may include a checking whether the lock-in option has been activated. In addition, descriptive and/or explanatory text ("display text") may be specified for rich media search suggestions. In at least one embodiment, presentations of rich media search suggestions include the specified display text in relatively close proximity. Alternatively, or in addition, rich media search suggestions may incorporate the specified display text. The triggering prefix and/or the current search input by the user may be emphasized (e.g., visually emphasized) in the rich media search suggestion presentation.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a build portion (or side) and a production portion. The production portion may include one or more electronic client devices such as the client devices 102 depicted in FIG. 1. The client devices 102 may include any appropriate device operable to send and receive requests, messages, or information over an appropriate network 104 and convey information back to a user of the client devices 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client devices 102, and may even handle a majority of the data access and business logic for an application.

The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client devices 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a build side designed to service the data store 110 rather than to service requests from the client devices 102. The build side of the environment 100 may include a development server 118, which can have functionality similar to the application server 108. In at least one embodiment, the application server 108 may also function as a build server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or build server 118, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on one of the client devices 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
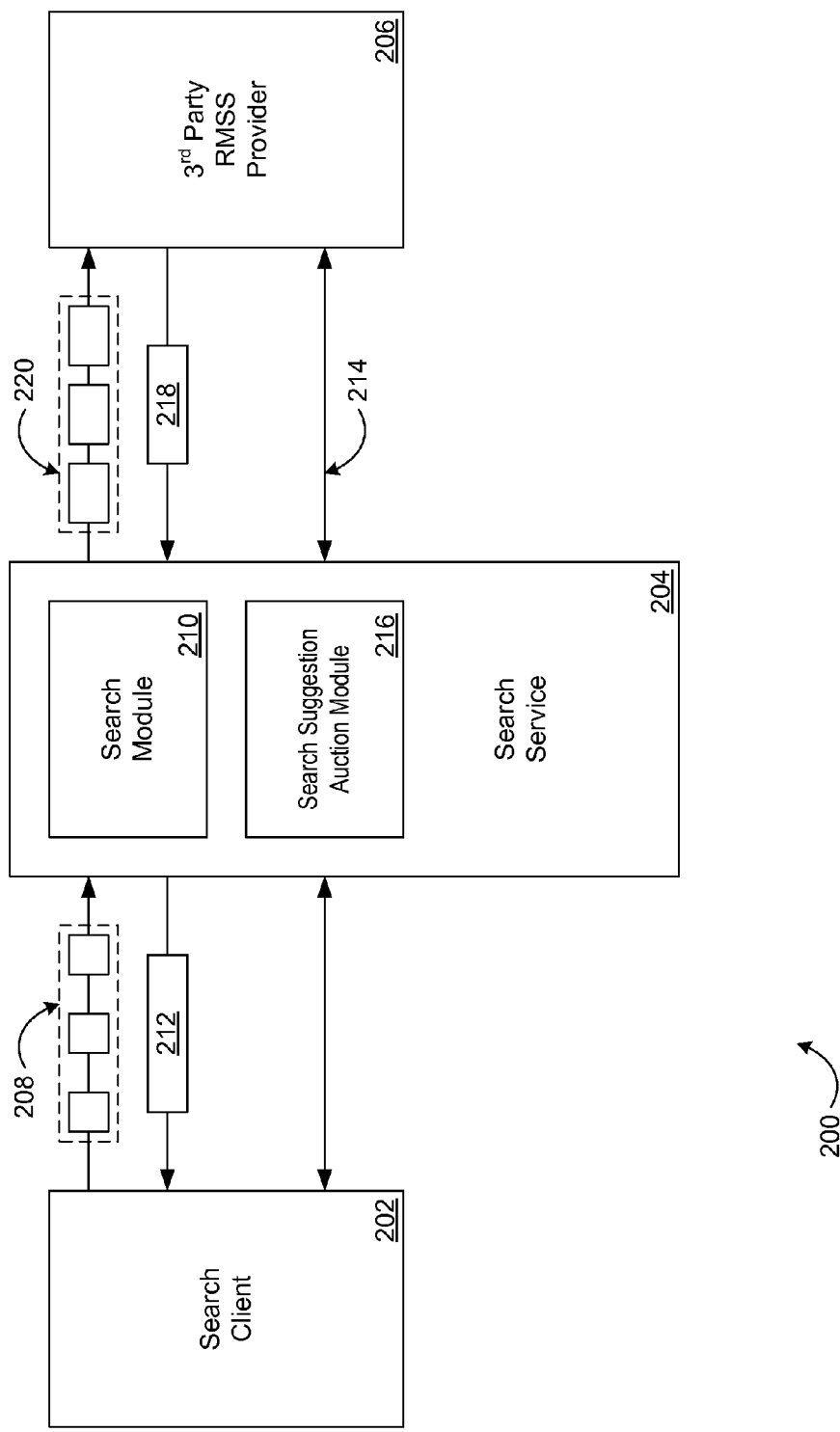
FIG. 2 is a schematic diagram depicting aspects of an example computerized system in accordance with at least one embodiment.

FIG. 2 depicts aspects of an example computerized system 200 configured to facilitate auctionable rich media search suggestions in accordance with at least one embodiment. The example system 200 includes a search client 202, a search service 204 and a third party rich media search suggestion (RMSS) provider 206. Although, for clarity, FIG. 2 depicts one each of the search client 202 and the third party RMSS provider 206, systems in accordance with at least one embodiment may include any suitable number of search clients and any suitable number of third party RMSS providers. The search client 202, the search service 204, and the third party RMSS provider 206 may be communicatively coupled, for example, by a communication network within a computer and/or between a plurality of computers such as the client devices 102 and the servers 106, 108, 118 of FIG. 1. For example, the search client 202 may be hosted and/or implemented at least in part by one of the client devices 102, and the search service 204 and the third party RMSS provider 206 may be hosted and/or implemented at least in part by computer systems corresponding to the web server 106, the application server 108, the build server 118 and/or the data store 110.

The search client 202 may generate a search input stream 208 of search input elements such as characters of text. The unlabeled squares inside the dashed line 208 represent search input elements in FIG. 2. For example, characters of text may include characters in accordance with a Unicode standard such as "The Unicode Standard, Version 5.0 (5th Edition)," authored by The Unicode Consortium, and published by Addison-Wesley Professional on Nov. 19, 2006. When the search input elements are characters of text, the search input stream 208 may be called a search input keystream (e.g., with reference to a keyboard method of input). However, search input elements are not limited to characters of text. For example, search input elements may include static images, audio, video, clickstreams, and any digitized data suitable for use as search input. The search client 202 may communicate the search input stream 208 to a search module 210 of the search service 204. The search module 210 may respond to sequences of the search input elements in the search input stream 208 by generating search suggestions 212 and/or search results. The search module 210 may communicate the search suggestions 212 and/or the search results to the search client 202, for example, as part of a search user interface specification and/or a search user interface update.

The third party RMSS provider 206 may bid to provide search suggestions including rich media search suggestions to the search client 202 responsive to the search input stream 208. For example, the third party RMSS provider 206 may bid to provide search suggestions responsive to detection of character sequences such as keyword prefixes in the search input stream 208. Such bids may be placed by the third party RMSS provider 206 by interacting 214 with a search suggestion auction module 216 of the search service 204. Such interaction 214 may include specifying search suggestions and/or rich media search suggestions to be provided responsive to specified sequences of search input elements. Alternatively, or in addition, the search suggestion auction module 216 may notify 214 the third party RMSS provider 206 of winning bids, and expect a search suggestion and/or rich media search suggestion 218 in response. In at least one embodiment, the search suggestion auction module 216 relays the search input stream 208 and/or an augmented search input stream 220 associated with a winning bid to the third party RMSS provider 206, and the third party RMSS provider 206 may provide tailored rich media search suggestions 218 in response. For example, the augmented search input stream 220 may include search context data such as search category, user demographic data and user behavior data. Although not shown explicitly in FIG. 2, in at least one embodiment, the third party RMSS provider 206 may provide the rich media search suggestion 218 directly to the search client 202 associated with the winning bid.

Figure 3:
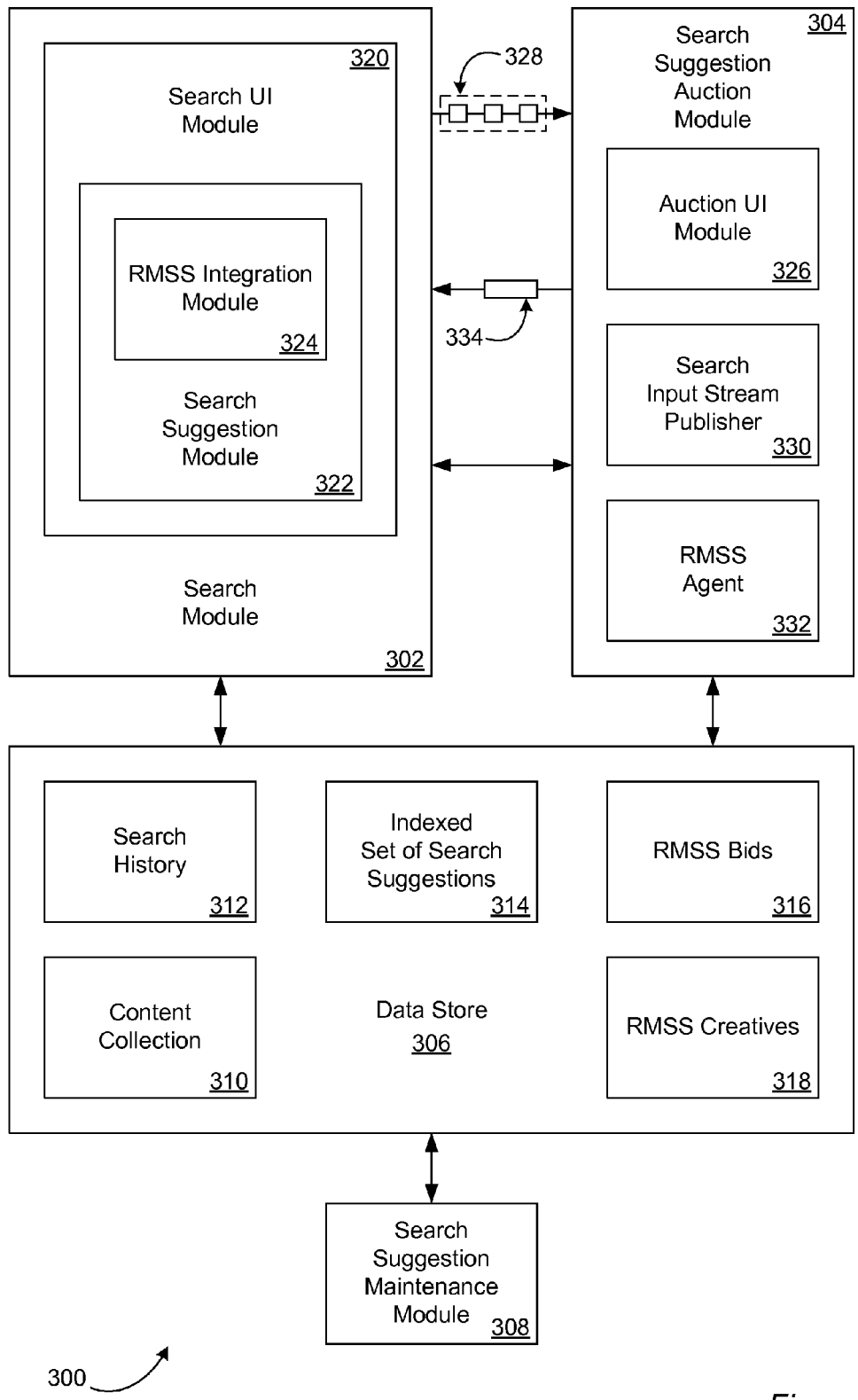
FIG. 3 is a schematic diagram depicting aspects of an example search service in accordance with at least one embodiment.

FIG. 3 depicts aspects of an example search service 300 in accordance with at least one embodiment. The search service 300 of FIG. 3 is an example of the search service 204 of FIG. 2. The search service 300 of FIG. 3 includes a search module 302, a search suggestion auction module 304, a data store 306 and a search suggestion maintenance module 308. The search module 302 of FIG. 3 is an example of the search module 210 of FIG. 2. The search suggestion auction module 304 of FIG. 3 is an example of the auction module 216 of FIG. 2. The data store 306 of FIG. 3 is an example of the data store 110 of FIG. 1. The arrows between the search module 302, the search suggestion auction module 304, the data store 306 and the search suggestion maintenance module 308 indicate that these components are communicatively coupled as described above with reference to FIG. 2.

The data store 306 may include a content collection 310 that is searched by the search module 302, a search history 312 recording details of such searches, and an indexed set of search suggestions 314 maintained by the search suggestion maintenance module 308. The data store 306 may further include a set of RMSS bids 316 recorded by the search suggestion auction module 304 for third party RMSS providers such as the third party RMSS provider 206 of FIG. 2. At least some of the RMSS bids 316 may be associated with RMSS creatives 318 such as RMSS presentation specifications, and these too may be stored in the data store 306.

The search module 302 may include a search user interface (UI) module 320 configured to maintain a suitable search UI for search clients such as the search client 202 of FIG. 2. The search UI module 320 may include a search suggestion module 322 configured to maintain search suggestion aspects of the search UI. In at least one embodiment, the search suggestion module 322 includes an RMSS integration module 324 configured to integrate search suggestions and/or rich media search suggestions provided by the search suggestion auction module 304 and/or third party search suggestion providers such as the third party RMSS provider 206 of FIG. 2 into the search UI.

Each search suggestion, including rich media search suggestions, may be associated with one or more search terms. User selection of the search suggestion, for example, by interacting with the search UI presented at the search client 202 (FIG. 2), may submit the search term(s) to the search module 302. The search module 302 may search the content collection 310 to find a subset of the content collection 310 that is most relevant to the search term(s) (i.e., find a set of "search results"), and the search UI module 320 may format the set of search results for presentation at the search client 202. The search module 302 may utilize any suitable relevance determination technique to determine content in the content collection 310 that is relevant to the search term(s). Alternatively, or in addition, rich media search suggestions may be associated with pre-defined subsets of the content collection 310, and the search module 302 may include the pre-defined subsets in the search results.

The search suggestion auction module 304 may include an auction user interface (UI) module 326 configured to maintain a suitable search suggestion auction UI for third party search suggestion providers such as the third party RMSS provider 206 of FIG. 2 and/or search suggestion auction administrators. The search module 302 may provide the search suggestion auction module 304 with search input streams 328 associated with RMSS bids 316 and/or any suitable search input stream. The search suggestion auction module 304 may match search input element sequences in the search input streams 328 against the RMSS bids 316, and hold an auction among the matching RMSS bids to determine one or more winning bids. The search suggestion auction module 304 may include a search input stream publisher 330 configured to publish search input streams 328 to third party search suggestion providers such as the third party RMSS provider 206 of FIG. 2 associated with available search suggestion places, winning bids and/or an RMSS agent 332.

Rich media search suggestions presented at the search client 202 (FIG. 2) may provide for various levels of functionality. For example, the presentation of some rich media search suggestions may be relatively static, while other rich media search suggestions may have a constantly changing presentation. Some rich media search suggestion presentations may be responsive to user interaction, while other rich media search suggestion presentations may be relatively unresponsive. Some rich media search suggestions may be responsive to the search input stream 208. For example, if the search input stream 208 indicates that the search client 202 is interested in a particular movie, some responsive rich media search suggestions may present show times for the movie at theatres local to the search client 202. As another example, some responsive rich media search suggestions may interpret the search input stream 208 as control commands for various games.

Accordingly, rich media search suggestions may require various levels of support from the search service 204 (FIG. 2) and/or the third party RMSS provider 206 in terms of resources and functionality. Some rich media search suggestions associated with winning bids ("winning RMSS") may be supported and/or maintained by the RMSS agent 332 without further reference to the third party RMSS provider 206. For example, the RMSS agent 332 may provide the search module 302 with winning RMSS 334, and/or specifications thereof including presentation specifications, based at least in part on the RMSS creatives 318 provided as part of the bids. Alternatively, or in addition, the RMSS agent may partially or fully delegate RMSS support to the associated third party RMSS provider.

Having provided an overview of the example search service 300, the description now turns to some salient details of the example search service 300 in accordance with at least one embodiment. The content collection 310 may include any suitable content. Examples of suitable content include electronic records, data structures, data objects, representations including representations of goods such as physical goods and commercial goods and representations of services such as commercial services, documents, document collections, images including digital images in any suitable image format, audio, video, virtual environments including virtual realities (VR) and recordings thereof, and suitable combinations thereof. The search history 312 may include any suitable details of searches performed by the search module 302. Examples of suitable search details include search terms along with any suitable metadata including a timestamp corresponding to a time and/or a date that the search was performed by the search module 302. In at least one embodiment, duplicate searches are not removed and/or filtered from the search history 312, and/or at least, duplicates are counted and/or otherwise suitably summarized.

The search suggestion maintenance module 308 may analyze the content collection 310 and/or the search history 312 to create and/or update the indexed set of search suggestions 314. For example, the search suggestion maintenance module 308 may determine a most popular set of search terms in the search history 312 for each of an indexing set of search input element sequences. In at least one embodiment, the indexing set of search input element sequences includes initial search input element sequences (e.g., initial in the search input stream 208 for a search and/or search client 202 of FIG. 2), search term prefixes, search phrase prefixes, and/or keyword prefixes. The search suggestion maintenance module 308 may maintain multiple versions of the indexed set of search suggestions 314. For example, the search suggestion maintenance module 308 may maintain a 'live' or production version of the indexed set of search suggestions 314 in use for current searches, and an update-in-progress or 'build' version that is currently being updated.

Bids in the set of RMSS bids 316 may include any suitable bid parameters. Examples of suitable bid parameters include bid amounts specified in terms of a currency, bid tokens and/or resource tokens, target sequences of search input elements, references to RMSS creatives 318, associated display text, associated keywords and/or search terms, and references to RMSS provisioning resources such as a set of network addresses associated with the third party RMSS provider 206 (FIG. 2). Some bid amounts may be associated with particular target sequences of search input elements. As describe in more detail below with reference to FIG. 4 and FIG. 5, in at least one embodiment, third party search suggestion providers may bid for placement among a set of search suggestions presented to a user. In such a case, the bid parameters may include search suggestion place specifications and/or preferences, and some bid amounts may be associated with particular search suggestion places.

The RMSS creatives 318 may include any suitable rich media resource. Examples of suitable rich media resources include digital images and graphics including animated graphics, video, audio, virtual environments including virtual realities (VR) and recordings thereof, data structures, data objects, programmatic objects, executable objects, presentation data such as presentation specifications in any suitable presentation specification language including media specification languages, presentation markup languages such as hypertext markup languages (e.g., HTML) and style sheet languages (e.g., CSS), suitable programming and/or scripting languages (e.g., JavaScript), and suitable combinations thereof. The RMSS creatives 318 may further include partially or fully cached versions and/or template versions of rich media search suggestions provided by the third party RMSS provider 206 (FIG. 2).

Rich media search suggestions may correspond to subsets of the content collection 310, for example, based at least in part on the associated set of search terms. In addition, the rich media search suggestions and/or associated RMSS creatives 318 may be representative (e.g., visually representative) of the subsets of the content collection 310. For example, where the subset of the content collection 310 includes representations of physical objects, the associated RMSS creatives 318 may include images of the physical objects. Where the subset of the content collection 310 is associated with a brand, an identity, a lifestyle, or a feeling, the corresponding RMSS creatives 318 may include media representative of the brand, identity, lifestyle or feeling.

The search UI module 320 may provide information from the search module 302 and/or the search suggestion module 322 for presentation. For example, the search UI module 320 may generate a search user interface (UI) presentation specification and provide the specification to the search client 202 (FIG. 2). The search UI module 320 may specify the search UI presentation with any suitable presentation specification language. The search UI module 320 may receive information responsive to the search UI presentation. For example, the search UI module 320 may receive the search input stream 208 from the search client 202. The search UI module 320 may process received search input and activate associated search module 302 functionality in response.

The search suggestion module 322 may provide search suggestion aspects of the search UI, including search suggestion placement. For example, the search suggestion module 322 may generate and/or maintain a search suggestion presentation specification that is incorporated into the search UI presentation specification by the search UI module 320. The RMSS integration module 324 may facilitate incorporation of third part rich media search suggestions into the search UI. For example, the RMSS integration module 324 may interact with the RMSS agent 322 and/or the third party RMSS provider 206 (FIG. 2) to obtain RMSS presentation specifications suitable for incorporation and/or to generate RMSS presentation specifications based at least in part on information provided by the RMSS agent 322 and/or the third party RMSS provider 206.

The auction UI module 326 may provide information from the search suggestion auction module 304 for presentation. For example, the auction UI module 326 may generate an auction user interface (UI) presentation specification and provide the specification to third party search suggestion providers such as the third party RMSS provider 206 of FIG. 2. The auction UI module 326 may specify the auction UI presentation with any suitable presentation specification language. The auction UI module 326 may receive information responsive to the auction UI presentation. For example, the auction UI module 326 may receive search suggestion bid data suitable for creating and/or updating RMSS bids 316 and RMSS creatives 318.

Winning bidders may subscribe, and/or be subscribed by the search suggestion auction module 304, to associated search input streams 328 through a user interface (e.g., a publish-subscribe programmatic interface) provided by the search input stream publisher 330. The search input stream publisher 330 may validate authorization to subscribe to a particular search input stream, and may monitor and delete subscriptions associated with authorizations that become invalid, for example, because the search input stream becomes invalid, because the winning bid is associated with a time limit, and/or as otherwise determined by the search suggestion auction module 304. Search input streams 328 may be identified by search, search session, search client, and/or as otherwise provided by the search module 302.

Figure 4:
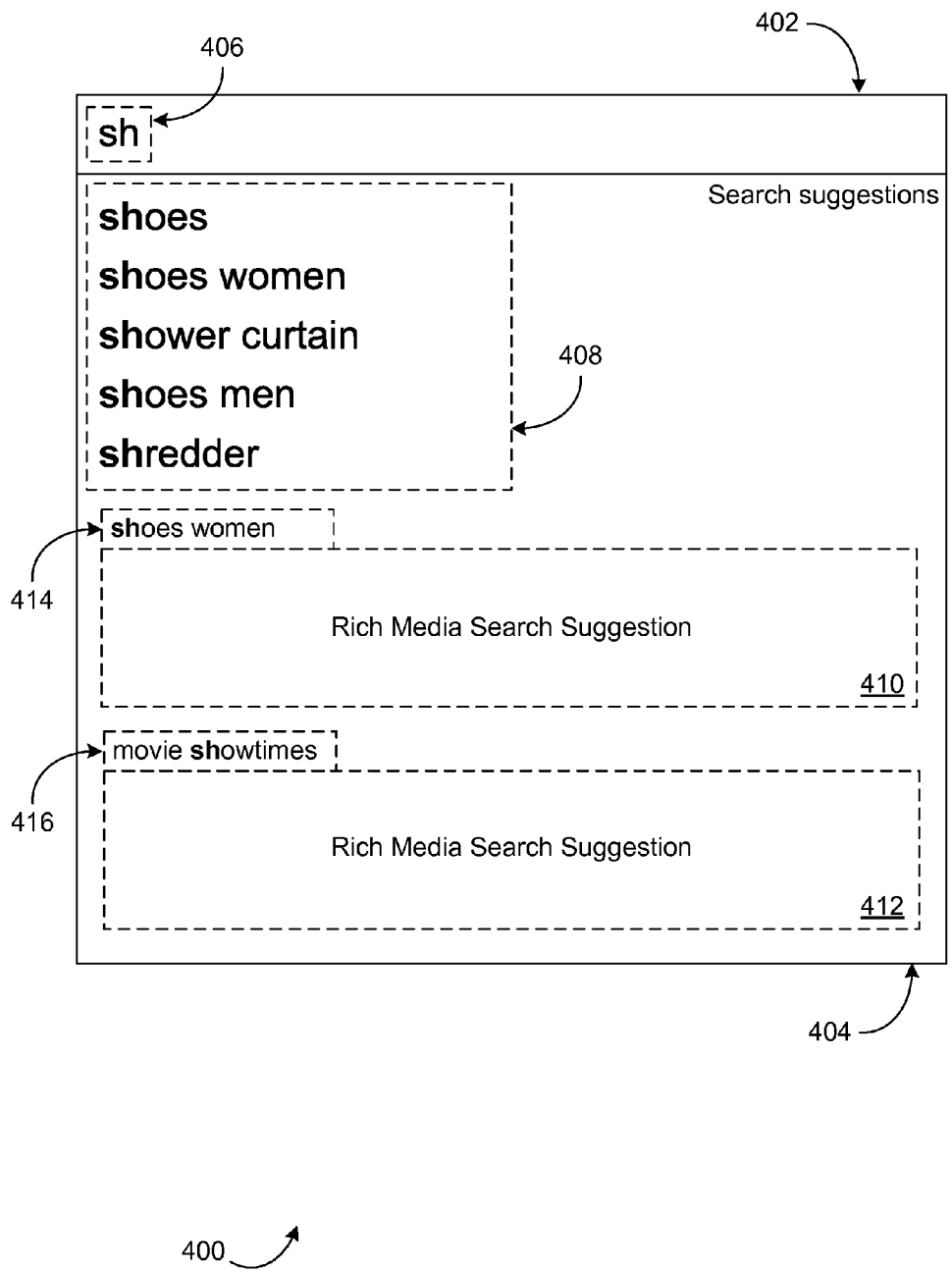
FIG. 4 is a schematic diagram depicting aspects of an example search user interface component in accordance with at least one embodiment.

FIG. 4 depicts aspects of an example search UI component 400 in accordance with at least one embodiment. For example, the search UI component 400 may be specified and provided for presentation by the search UI module 302 of FIG. 3. The example search UI component 400 includes a search input component 402 and a search suggestion presentation component 404. The search input component 402 may facilitate the entry of search input 406. The search input 406 may be utilized by the search client 202 (FIG. 2) to generate the search input stream 208. In this example, a user of the search client 202 (FIG. 2) has entered the sequence of characters 'sh'. Since the search input 406 is an initial sequence of characters, it may be interpreted as a prefix of one or more keywords, search terms and/or search phrases.

The example search suggestion presentation component 404 includes a set of text search suggestions 408 and a list of rich media search suggestions 410 and 412. Search suggestion presentations in accordance with at least one embodiment are not limited to the number and/or order of the text search suggestions 408 and/or rich media search suggestions 410 and 412 shown in FIG. 4, and may include any suitable number and/or order thereof. In this example, the text search suggestions 408 include five search terms each beginning with the search input 406. The rich media search suggestions 410 and 412 are shown displayed with associated display text 414 and 416, respectively. The display text 414, 416 is displayed in proximity to the rich media search suggestion 410, 412 so that the two are visually associated. The display text 414, 416 also include the search input 406, and portions of the display text 414, 416 corresponding to the search input 406 are visually emphasized. However, each embodiment is not so limited.

The rich media search suggestions 410, 412 are associated with presentation areas (i.e., the presentation areas depicted in FIG. 4). Such presentation areas may be initial presentation areas. For example, the rich media search suggestion 410 may occupy additional presentation area in response to user interaction. The rich media search suggestions 410, 412 may each be associated with a hysteresis condition. For example, the rich media search suggestion 412 may have a hysteresis condition specifying a hysteresis period (e.g., 5 seconds) during which the rich media search suggestion 412 is guaranteed to be displayed regardless of changes to the search input 406. The hysteresis period may be understood as a "time window" during which control of the associated rich media search suggestion presentation area is made available to the third party RMSS provider 206 (FIG. 2). Alternatively, or in addition, the hysteresis condition may specify that the particular rich media search suggestion 412 is to be displayed at least until a particular number (and/or addition number) of characters have been entered with the search input component 402, a particular user interface event (e.g., search input component 402 defocus) is detected, a particular number (e.g., 1 or 2) of keywords has been entered with the search input component 402, and/or while a lock-in option associated with the rich media search suggestion 412 is activated.

The number of the text search suggestions 408 and/or the rich media search suggestions 410, 412 may vary dynamically. For example, the rich media search suggestion 412 may disappear after its associated hysteresis condition has been satisfied and/or based at least in part on the associated winning bid (e.g., the bid amount). Rich media search suggestions not shown in FIG. 4 may be added dynamically to the search suggestion presentation component 404. The list of rich media search suggestions 410, 412 may behave as a stack. For example, new rich media search suggestions may be displayed at the top of the stack (e.g., nearest the search input component 402) and the present rich media search suggestions pushed down. If the stack is of a limited size, the rich media search suggestion presently at the bottom of the stack may disappear. Alternatively, or in addition, some winning bids may be sufficient to reset and/or otherwise clear the list of rich media search suggestions 410, 412 except for the RMSS associated with the winning bid.

Although the list of rich media search suggestions 410, 412 is shown vertically below the text search suggestions 408, each embodiment is not so limited. Such lists of rich media search suggestions may be presented in any suitable relationship to the text search suggestions 408 including vertically above, horizontally to the left, horizontally to the right, floating but not overlapping, floating and overlapping, and otherwise overlapping. In at least one embodiment, the list of rich media search suggestions 410, 412 may replace the text search suggestions 408 entirely.

Figure 5:
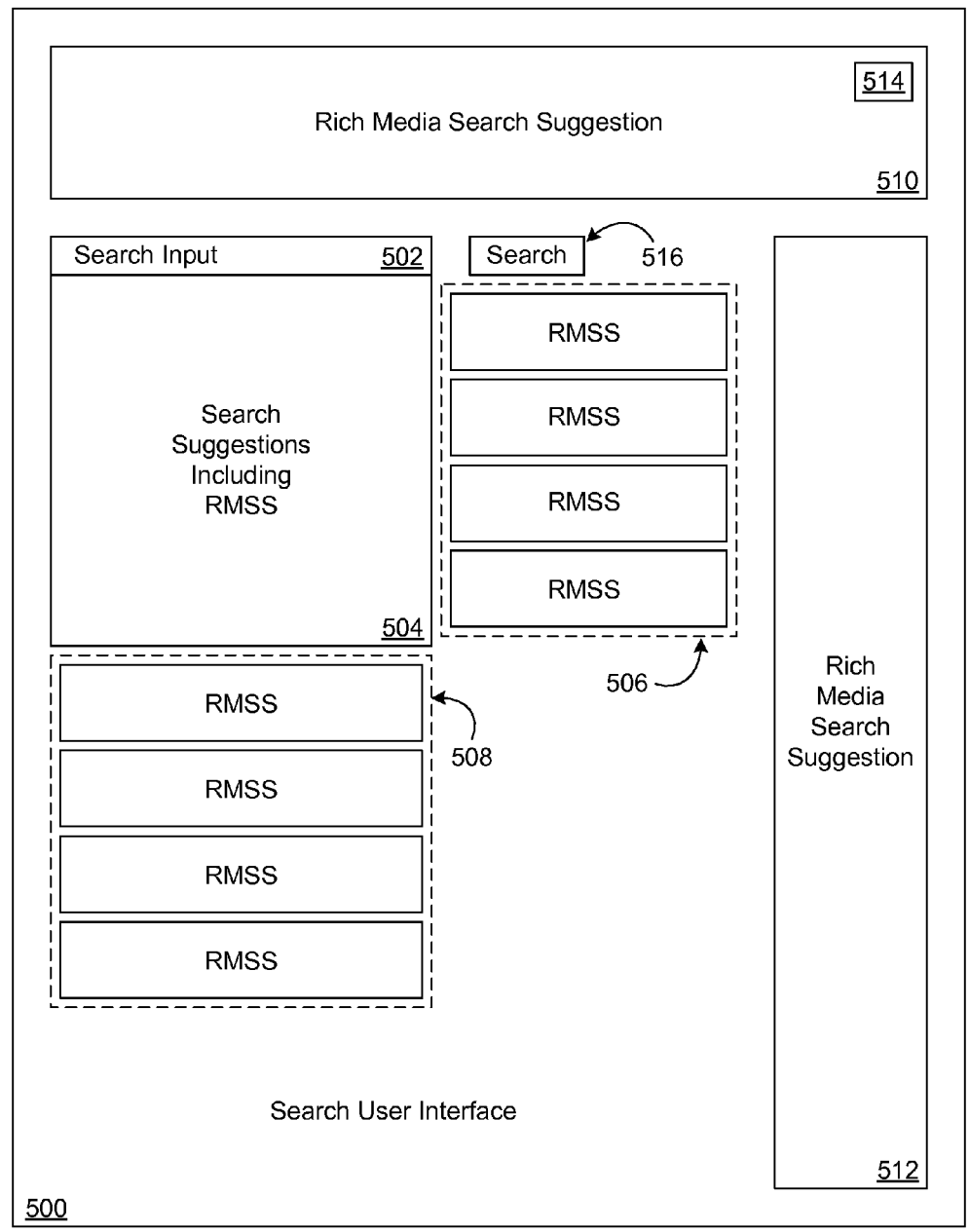
FIG. 5 is a schematic diagram depicting aspects of an example search user interface in accordance with at least one embodiment.

FIG. 5 depicts aspects of an example search UI 500 in accordance with at least one embodiment. The example search UI 500 includes a search input component 502 and a search suggestion presentation component 504 corresponding to the search input component 402 and search suggestion presentation component 404 of FIG. 4, as well as illustrating additional rich media search suggestion presentation possibilities in accordance with at least one embodiment. For example, the search UI 500 may include additional lists 506, 508 of rich media search suggestions, as well as rich media search suggestions 510, 512 that occupy significant areas of the visible search UI 500 presentation. Each rich media search suggestion (e.g., 510, 512, in the lists 506, 508, and in the search suggestion presentation component 504) may be incorporated into the search UI 500 as an independent user interface component associated with its own presentation specification. FIG. 5 shows the rich media search suggestion 510 as including a lock-in option component 514. Users may activate and/or deactivate the lock-in option for the rich media search suggestion 510. Any suitable rich media search suggestion may be presented with a lock-in option component corresponding to the lock-in option component 514.

The search UI 500 may further include a search button 516 configured to cause the search input entered into the search input component 502 to be submitted to the search service 300 (FIG. 3). User interaction with a search suggestion in the search suggestion presentation component 504 and/or other rich media search suggestions may also cause associated search terms to be submitted to the search service 300. However, in at least one embodiment, results of user interaction with rich media search suggestions may be controlled by the third party RMSS provider 206 (FIG. 2) that is providing the rich media search suggestion.

Figure 6:
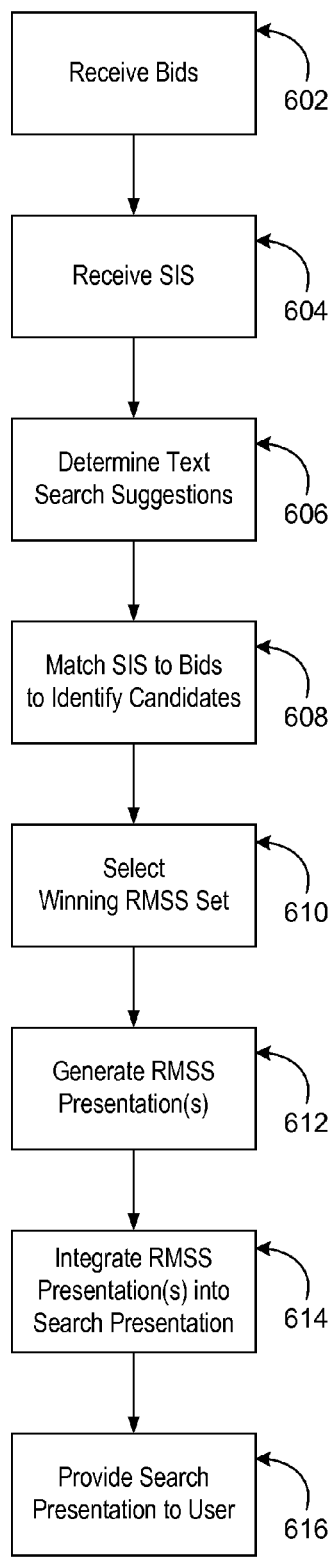
FIG. 6 is a flowchart depicting example steps for rich media search suggestions in accordance with at least one embodiment.

The description now turns to example steps that may be performed in accordance with at least one embodiment. FIG. 6 depicts example steps for rich media search suggestions in accordance with at least one embodiment. At step 602, one or more bids may be received. For example, the search suggestion auction module 304 (FIG. 3) may receive RMSS bids 316 through an interface of the auction UI module 326. At step 604, a search input stream may be received. For example, the search module 302 may receive one or more search input streams such as the search input stream 208 (FIG. 2) from search clients such as the search client 202. The performance of step 602 may be removed in time (e.g., on the order of days) from the performance of step 604. Alternatively, or in addition, bids may be received in real-time and/or near real-time responsive to the search input stream 220.

At step 606, one or more text search suggestions may be determined based at least in part on the search input stream received at step 604. For example, the search suggestion module 322 (FIG. 3) may determine a subset of the search suggestions 314 in the data store 306 that is indexed by a sequence of search input elements corresponding to a sequence (e.g., an initial sequence) of search input elements in the search input stream. In at least one embodiment, the one or more text search suggestions may be determined based further at least in part on the search history 312 and/or a portion of the search history 312 associated with a particular user and/or search session. For example, in response to the received search input keystream sequence "ipo", the text search suggestions may include "ipod nano 16 mb" if the user has previously used that search input. Although step 606 is performed in at least one embodiment, each embodiment is not so limited. Text search suggestions need not be incorporated in systems or methods in accordance with at least one embodiment.

At step 608, the search input stream received at step 604 may be matched against the one or more bids received at step 602 to identify a set of candidate bids. For example, RMSS bids 316 (FIG. 3) stored in the data store 306 may each be associated with a target sequence of search input elements, and the search suggestion auction module 304 may match a sequence (e.g., an initial sequence) of search input elements in the search input stream against the target sequences. The matching of step 608 need not be exact. For example, the sequence of characters 'sh' may match bids targeting character sequences such as 'sho', 'fish', and 'movie sh' to varying degrees. In at least one embodiment, the search suggestion auction module 304 may be configured to match the search input stream to the RMSS bids 316 in accordance with a set of bid matching rules. Bid matching rules may include rules specifying regular expressions ("regex"). In at least one embodiment, the matching of step 608 is not performed until the search input stream received at step 604 includes a minimum number of search input elements. Alternatively, or in addition, the text search suggestions determined at step 606, and/or common misspellings thereof, may be matched against the bids.

At step 610, a winning subset of the candidate bids identified at step 608 may be selected. For example, the search UI 500 (FIG. 5) may have a limited set of search suggestion places available for auction to third party search suggestion providers such as RMSS places 510, 512 and RMSS places in the search suggestion presentation component 504 and the RMSS lists 506, 508. The available set of search suggestion places may vary dynamically. For example, hysteresis conditions associated with currently presented RMSS may be satisfied. The search suggestion auction module 304 (FIG. 3) may select a winning one of the candidate bids for each of the available search suggestion places. For example, the search suggestion auction module 304 may select the winning bid from among the candidate bids based at least in part on bid amounts associated with the candidate bids, degrees of match with the search input stream determined at step 608, and/or any suitable bid parameter. In at least one embodiment, the search suggestion auction module 304 selects winning bids associated with highest bid amounts. Further details of RMSS auctions in accordance with at least one embodiment are described below with reference to FIG. 7.

At step 612, search suggestion presentations may be generated for search suggestions associated with each of the winning bids. For example, the RMSS agent 332 (FIG. 3) may generate RMSS presentations associated with winning bids. Alternatively, or in addition, the search suggestion presentations may be generated by third party search suggestion providers such as the third party RMSS provider 206 of FIG. 2.

At step 614, the search suggestion presentations generated at step 612 may be integrated into a presentation of the search UI 500 (FIG. 5). For example, the RMSS agent 332 (FIG. 3) may provide the generated RMSS presentations to the RMSS integration module 324, and the RMSS integration module 324 may interact with the search suggestion module 322 and/or the search UI module 320 to integrate with a presentation of the search UI 500. Integrating the generated RMSS presentations with the search UI 500 presentation may include modifying a specification of the search UI 500 presentation to include specifications of the generated RMSS presentations. Alternatively, or in addition, the search UI 500 presentation specification may be updated to specify delegation of control of presentation areas to third party search suggestion providers. For example, if the search UI 500 presentation is specified with a hypertext markup language, hypertext frames such as inline frames may be utilized to accomplish such delegation, as will be apparent to one of skill in the art.

At step 616, the search UI 500 (FIG. 5) presentation may be provided to a user. For example, the search module 302 (FIG. 3) may provide the search UI 500 presentation specification to the search client 202 (FIG. 2), and the search client 202 may render the search UI 500 presentation in accordance with the provided specification. In response to the search UI 500 presentation, the user may select one of the presented search suggestions or provide additional search input elements for the search input stream. If the user provides additional search input elements for the search input stream, or otherwise modifies the search input stream, a procedure incorporating step 616 may return to step 604. If the user selects one of the presented search suggestions, the search module 302 may provide a search result set in response, as described above with reference to FIG. 3.

Figure 7:
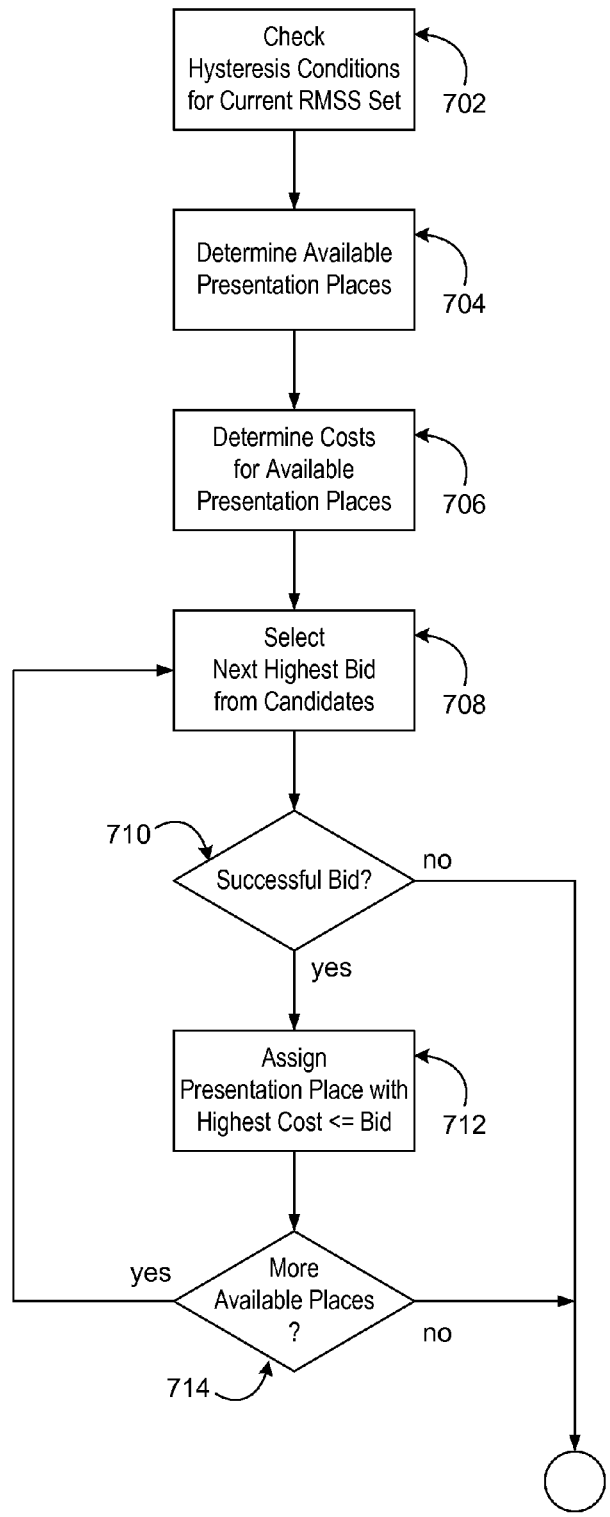
FIG. 7 is a flowchart depicting example steps for rich media search suggestion auctions in accordance with at least one embodiment.

FIG. 7 depicts example steps for RMSS auctions in accordance with at least one embodiment. At step 702, one or more hysteresis conditions may be checked for each RMSS in a current RMSS set. For example, the current RMSS set may include each RMSS presented as part of the search UI 500 (FIG. 5) that is associated with a winning bid. Each RMSS may be associated with a hysteresis condition specifying a hysteresis period. The search suggestion auction module 304 (FIG. 3) may track an amount of presentation time that each such RMSS is presented to a particular user, for example, as identified by association with a particular search input stream 328. Alternatively, or in addition, the search UI module 320 may track and make available such presentation times. The search suggestion auction module 304 may check each hysteresis condition, for example, by comparing the specified hysteresis period with the presentation time. Checking of hysteresis conditions by the search suggestion auction module 304 may also involve counting search input stream 328 elements, identifying keywords or the equivalent in the search input stream 328, receiving notifications of user actions detected by the search UI module 320, and/or checking whether an associated lock-in option is activated.

At step 704, a set of available search suggestion places may be determined. For example, the search suggestion auction module 304 (FIG. 3) may track allocation of RMSS associated with winning bids to a fixed number of available search suggestion places associated with a particular search UI 500 (FIG. 5), and determine the current number of available search suggestion places based at least in part on such tracking. Alternatively, or in addition, the search UI module 320 may track search suggestion places allocated to and/or available for allocation to third party search suggestion providers, and may provide such information upon request. In at least one embodiment, the third party RMSS provider 206 (FIG. 2) may explicitly relinquish a search suggestion place at any suitable time and/or upon detection of any suitable condition.

At step 706, a cost may be determined for each of the available search suggestion places. For example, the search suggestion auction module 304 (FIG. 3) may determine such costs based at least in part on suitable bid parameters of candidate bids (e.g., as determined at step 608 of FIG. 6) such as bid amounts, whether hysteresis conditions associated with current and/or previous winning bids are satisfied, suitable attributes of the available search suggestion places such as proximity to the search input component 502 (FIG. 5) and/or a location of the search suggestion place within the search UI 500, and/or suitable attributes of the user generating the search input stream such as demographic attributes. The costs determined at step 706 may be a minimum cost (e.g., $0.01, 1 resource token, etc) to provide search suggestions at the available search suggestion places and/or a cost to override and/or displace search suggestions currently occupying the available search suggestion places. Where there are multiple available search suggestion places on auction, a cost to be the sole presented RMSS may also be determined at step 706.

At step 708, a next (e.g., a first) highest bid may be selected from among the set of candidate bids. For example, the auction module 304 (FIG. 3) may select one of the set of candidate bids associated with a highest bid amount. If a particular bid has previously been a winning bid with respect to a particular user, the particular bid may be given priority even if not the highest bid. At step 710, it may be determined if the bid selected at step 708 is successful. For example, the auction module 304 may compare the bid amount associated with the bid selected at step 708 with the costs determined at step 706. The auction module 304 may determine the bid selected at step 708 to be successful if the associated bid amount is greater than or equal to at least one of the costs determined at step 706. If the bid selected at step 708 is not successful, then a procedure incorporating step 710 may progress to one or more steps not shown in FIG. 7, for example, to step 616 of FIG. 6. Otherwise, the procedure may progress to step 712.

At step 712, a search suggestion place having a highest associated cost may be assigned to the bid selected at step 708. That is, the bid selected at step 708 may become a winning bid. For example, the auction module 304 (FIG. 3) may record the bid selected at step 708 as the winning bid for the search suggestion place. At step 714, it may be determined whether there are search suggestion places remaining to be assigned. For example, the auction module 304 may track the number of unassigned search suggestion places. If the winning bid assigned at step 712 indicated a desire to be the sole presented RMSS, and the associated bid amount was sufficient, the auction module 304 may determine that there are no remaining search suggestion places to be assigned. If there are no remaining search suggestion places to be assigned, the procedure may progress to one or more steps not shown in FIG. 7, for example, to step 612 of FIG. 6. Otherwise, the procedure may return to step 708 to select a next highest bid.

Figure 8:
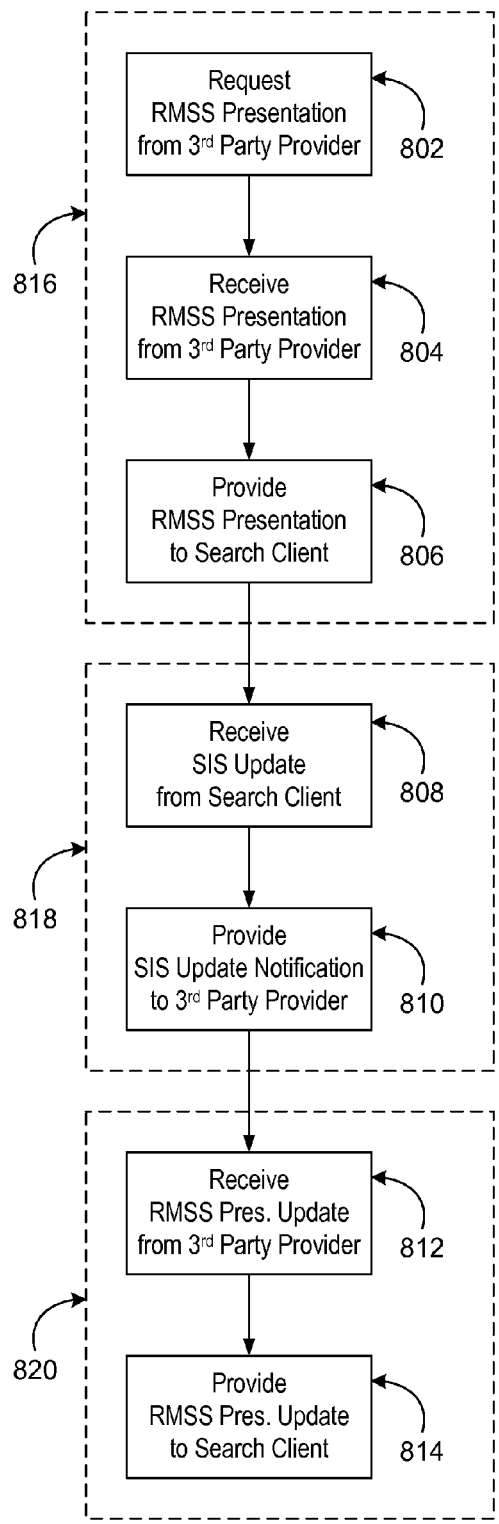
FIG. 8 is a flowchart depicting example steps for maintaining a rich media search suggestion presentation in accordance with at least one embodiment.

FIG. 8 depicts example steps for maintaining an RMSS presentation in accordance with at least one embodiment. At step 802, an RMSS presentation may be requested. For example, the search service 204 (FIG. 2) may request the third party RMSS provider 206 to provide a suitable RMSS presentation specification. At step 804, the RMSS presentation may be received. For example, the third party RMSS provider 306 may provide the requested RMSS presentation specification to the search service 204. At step 808, the RMSS presentation may be provided to a user. For example, the search service 204 may incorporate the received RMSS presentation specification into a search UI presentation specification and provide the search UI presentation specification to the search client 202 for presentation.

At step 808, a search input stream update may be received. For example, the search service 204 (FIG. 2) may receive one or more additional search input elements in the search input stream 208 from the search client 202. At step 810, a search input stream update notification may be provided. For example, the search service 204 may notify the third party RMSS provider 206 of the additional search input elements.

At step 812, an RMSS presentation update may be received. For example, the search service 204 (FIG. 2) may receive the RMSS presentation update from the third party RMSS provider 206 in response to the search input stream notification provided at step 810. At step 814, the RMSS presentation update may be provided to the user. For example, the search service 204 may update the search UI presentation provided to the search client 202 with the updated RMSS presentation.

A dashed line 816 around steps 802, 804 and 806 indicate that the steps 802, 804, 806 may be part of an initial RMSS presentation 816 to the user. In the example of FIG. 8, there is an intermediary between the search client 202 (FIG. 2) and the third party RMSS provider 206 such as the search service 204. However, each embodiment is not so limited. For example, the request of step 802 may be made by the search client 202 directly to the third party RMSS provider 206, the provision of step 806 may be made by the third party RMSS provider 206 directly to the search client 202, and step 804 may be omitted.

A dashed line 818 around steps 808 and 810 indicate that the steps 808, 810 may be part of a search input stream update to the third party search suggestion provider. Each embodiment need not include such updates, and such updates need not be routed through the search service 204 (FIG. 2) as in the example of FIG. 8. The search client 202 may provide search input stream updates directly to the third party RMSS provider 206. Similarly, a dashed line 820 around steps 812 and 814 indicate that the steps 812, 814 may be part of an RMSS presentation update at the search client 202. Each embodiment need not include such updates, and such updates need not be routed through the search service 204 as in the example of FIG. 8. The third party RMSS provider 206 may provide RMSS presentation updates directly to the search client 202.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing rich media search suggestions, comprising:
under control of one or more computer systems configured with executable instructions,
receiving at least one character of a search input keystream;
determining a set of search suggestions based at least in part on said at least one character of the search input keystream, the set of search suggestions including at least one rich media search suggestion;
receiving, from a third party search suggestion provider, at least a first web-based presentation specification for said at least one rich media search suggestion and at least one condition based at least in part upon one of a period of time, a number of elements of the search input keystream, or a user actions;
generating a second web-based presentation specification for the set of search suggestions, the second web-based presentation specification for the set of search suggestions incorporating said at least the first web-based presentation specification for said at least one rich media search suggestion in accordance with said at least one condition; and
providing the second web-based presentation specification for the set of search suggestions for web-based rendering,
wherein said at least one rich media search suggestion is presented for at least a guaranteed period of time between prior to an end of the search input keystream and until said at least one condition is met.

2. A computer-implemented method according to claim 1, wherein said at least one rich media search suggestion comprises interactive rich media.

3. A computer-implemented method according to claim 1, wherein said at least one rich media search suggestion comprises an interactive rich media advertisement.

4. A computer-implemented method according to claim 1, wherein:
the computer-implemented method further comprises searching a content collection based at least in part on one of the set of search suggestions; and
said at least one rich media search suggestion comprises rich media corresponding to a portion of the content collection.

5. A computer-implemented method according to claim 4, wherein said at least one rich media search suggestion comprises rich media representative of the portion of the content collection.

6. A computer-implemented method according to claim 1, wherein said at least one rich media search suggestion comprises rich media including a keyword corresponding to said at least one character of the search input keystream.

7. A computer-implemented method for rich media search suggestions, comprising:
under control of one or more computer systems configured with executable instructions,
receiving at least one element of a search input stream;
determining a set of search suggestions based at least in part on said at least one element of the search input stream, the set of search suggestions to include at least one rich media search suggestion;
receiving said at least one rich media search suggestion and at least one condition based at least in part upon one of a period of time, a number of elements of the search input stream, or a user action
generating search suggestion presentation data incorporating said at least one rich media search suggestion; and
providing the search suggestion presentation data for presentation,
wherein said at least one rich media search suggestion is resented for at least a guaranteed period of time until said at last one condition is met.

8. A computer-implemented method according to claim 7, further comprising:
receiving at least one further element of the search input stream; and
updating said at least one rich media search suggestion based at least in part on said at least one further element of the search input stream.

9. A computer-implemented method according to claim 7, wherein:
the search suggestion presentation data comprises a search suggestion presentation specification specified with a presentation markup language; and
said at least one rich media search suggestion is specified with the presentation markup language.

10. A computer-implemented method according to claim 7, wherein:
receiving said at least one rich media search comprises receiving rich media search suggestion presentation data from a third party rich media search suggestion provider; and
generating the search suggestion presentation data comprises incorporating the rich media search suggestion presentation data into the search suggestion presentation data.

11. A computer-implemented method according to claim 10, wherein the computer-implemented method further comprises requesting the rich media search suggestion presentation data from the third party rich media search suggestion provider.

12. A computer-implemented method according to claim 7, wherein the search suggestion presentation data comprises a search suggestion presentation specification that delegates specification of a presentation of said at least one rich media search suggestion to at least one third party rich media search suggestion provider.

13. A computer-implemented method according to claim 12, further comprising:
receiving at least one further element of the search input stream; and
relaying said at least one further element of the search input stream to said at least one third party rich media search suggestion provider.

14. A computer-implemented method for auctioning search suggestions, comprising:
under control of one or more computer systems configured with executable instructions,
receiving a bid to provide a search suggestion suited to a common prefix of a set of keywords, the bid specifying a condition based at least in part upon one of a period of time, a number of elements of a search input keystream, or a user action;
receiving the search input keystream that includes the prefix;
auctioning a set of available search suggestion places to determine a corresponding set of winning bids including the bid;
receiving the search suggestion associated with the bid;
generating search suggestion presentation data incorporating the search suggestion associated with the bid and presented in a corresponding search suggestion place in accordance with the condition specified by the bid; and
providing the search suggestion presentation data for presentation,
wherein the search suggestion is presented for at least a guaranteed period of time until said at last one condition is met.

15. A computer-implemented method according to claim 14, wherein the search suggestion presentation data specifies a user interface component for each search suggestion place corresponding to a winning bid.

16. A computer-implemented method according to claim 14, wherein:
the search suggestion presentation data specifies a plurality of search suggestion user interface components corresponding to a plurality of search suggestion places in the set of available search suggestion places, the plurality of search suggestion user interface components in proximity to a search input user interface component; and
search suggestions associated with higher bids are assigned to search suggestion places corresponding to search suggestion user interface components in closer proximity to the search input user interface component.

17. A computer-implemented method according to claim 16, wherein:
a plurality of rich media search suggestions are associated with winning bids and are each assigned to one of the plurality of search suggestion places; and
the search suggestion presentation data specifies that the plurality of search suggestion user interface components are arranged in a stack.

18. A computer-implemented method according to claim 14, wherein the search suggestion presentation data comprises a search suggestion presentation specification that delegates specification of a presentation of the search suggestion associated with the bid to a third party search suggestion provider.

19. A computer-implemented method according to claim 18, further comprising:
receiving at least one further character of the search input keystream in addition to the prefix; and
relaying said at east one further character to the third party search suggestion provider.

20. A computerized system for rich media search suggestions, comprising:
a processor;
a memory device including instructions that, when executed by the processor, cause the computerized system to:
receive at least one element of a search input stream;

determine a set of search suggestions based at least in part on said at least one element of the search input stream, the set of search suggestions to include a set of rich media search suggestions;

receive the set of rich media search suggestions and at least one condition based at least in part upon one of a period of time, a number of elements of the search input stream, or a user action;

generate search suggestion presentation data incorporating the set of rich media search suggestions, the search suggestion presentation data incorporating said at least one of the set of rich media search suggestions being in accordance with said at least one condition; and provide the search suggestion presentation data for presentation, wherein the set of rich media search suggestions are presented for at least a guaranteed period of time until said at least one condition is met.

21. A computerized system according to claim 20, wherein the search user interface module is further configured to, at least:

receive an indication of a selection of said at least one of the set of rich media search suggestions; and provide a set of search results in accordance with said at least one of the set of rich media search suggestions and said at least one condition.

22. A computerized system according to claim 21, wherein:

a set of search terms is specified for said at least one of the set of rich media search suggestions independent of the search input stream; and providing the set of search results in accordance with said at least one of the set of rich media search suggestions comprises determining the set of search results based at least in part on the set of search terms specified for said at least one of the set of rich media search suggestions.

23. One or more non-transitory computer-readable media having collectively thereon computer-executable instructions that configure one or more computers to collectively, at least:

receive at least one element of a search input stream;

determine a first set of rich media search suggestions based at least in part on said at least one element of the search input stream;

receive a first web-based presentation specification for each of the first set of rich media search suggestions and at least one condition based at least in part upon one of a period of time, a number of elements of the search input stream, or a user action;

generate a second-web based presentation specification for each of the first set of rich media search suggestions, the second-web based presentation specification incorporating the first web-based specification for each of the first set of rich media suggestions;

provide the second web-based presentation specification for presentation, each of the first set of rich media search suggestions being presented for at least a guaranteed period of time until said at least one condition is met;

receive a further element of the search input stream; and determine a second set of rich media search suggestions based at least in part on said at least one element of the search input stream and the further element of the search input stream.

24. One or more non-transitory computer-readable media according to claim 23, wherein said at least one condition corresponds to an amount of time the at least one of the first set of rich media search suggestions is presented to a user of the one or more computers.

25. One or more non-transitory computer-readable media according to claim 23, wherein the first set of rich media search suggestions includes said at least one of the first set of rich media search suggestions when at least one associated presentation time is within said at least one period of time.

* * * * *